United States Patent [19]

Tanaka et al.

[11] Patent Number: 5,172,856
[45] Date of Patent: Dec. 22, 1992

[54] CONTROL APPARATUS FOR AIR-CONDITIONING

[75] Inventors: Hisashi Tanaka; Motohiro Kitada, both of Anjo; Yousuke Taniguchi, Nagoya; Tadayuki Miyawaki, Aichi, all of Japan

[73] Assignee: Kabushiki Kaisha Toyota Chuo Kenkyusho Nippondenso Co., Ltd., Kariya, Japan

[21] Appl. No.: 580,935

[22] Filed: Sep. 12, 1990

[30] Foreign Application Priority Data

Apr. 24, 1990 [JP] Japan .................................. 2-108457

[51] Int. Cl.$^5$ .............................................. F24F 7/00
[52] U.S. Cl. .................................. 236/49.3; 236/91 C
[58] Field of Search ...................... 236/49, 3, 51, 1 R, 236/91 C; 165/43; 62/186

[56] References Cited

U.S. PATENT DOCUMENTS

| | | | |
|---|---|---|---|
| 4,024,725 | 5/1977 | Uchida et al. | 62/176 F |
| 4,920,759 | 5/1990 | Tanaka et al. | 62/244 |

FOREIGN PATENT DOCUMENTS

| | | |
|---|---|---|
| 55-95054 | 7/1980 | Japan . |
| 57-37642 | 3/1982 | Japan . |
| 6027904 | 3/1982 | Japan . |
| 60-92919 | 5/1985 | Japan . |
| 62-125243 | 6/1987 | Japan . |
| 62-299420 | 12/1987 | Japan . |
| 1-229713 | 9/1989 | Japan . |
| 2-136321 | 5/1990 | Japan . |
| 1232048 | 5/1971 | United Kingdom . |

OTHER PUBLICATIONS

"Indoor Climate" Aug. 30, 1978 Part III, pp. 425-440, Thermoreception and human comfort and pp. 491-505 Physiological responses and thermal comfort in changing environmental temperature and humidity.
"Ergonomics" Jan., 1978, pp. 21-34 "Human Responses During Recovery from Heat Stress with Relation to Comfort."

*Primary Examiner*—William E. Wayner
*Attorney, Agent, or Firm*—Cushman, Darby & Cushman

[57] ABSTRACT

A control apparatus for an air-conditioner provided with a flow controlling means which controls the amount of air blown into a room, a temperature control means to which controls the temperature of air blown, a skin temperature detecting means which detects the actual skin temperature of persons in the room, a temperature sensation determining means which determines the actual temperature sensation of persons in the room in accordance with the skin temperature detected above and the rate of change of this detected skin temperature, and an electrical control means which makes the flow control means bring the temperature sensation determined above into line with the target temperature sensation and which makes the temperature control means perform temperature control.

13 Claims, 9 Drawing Sheets

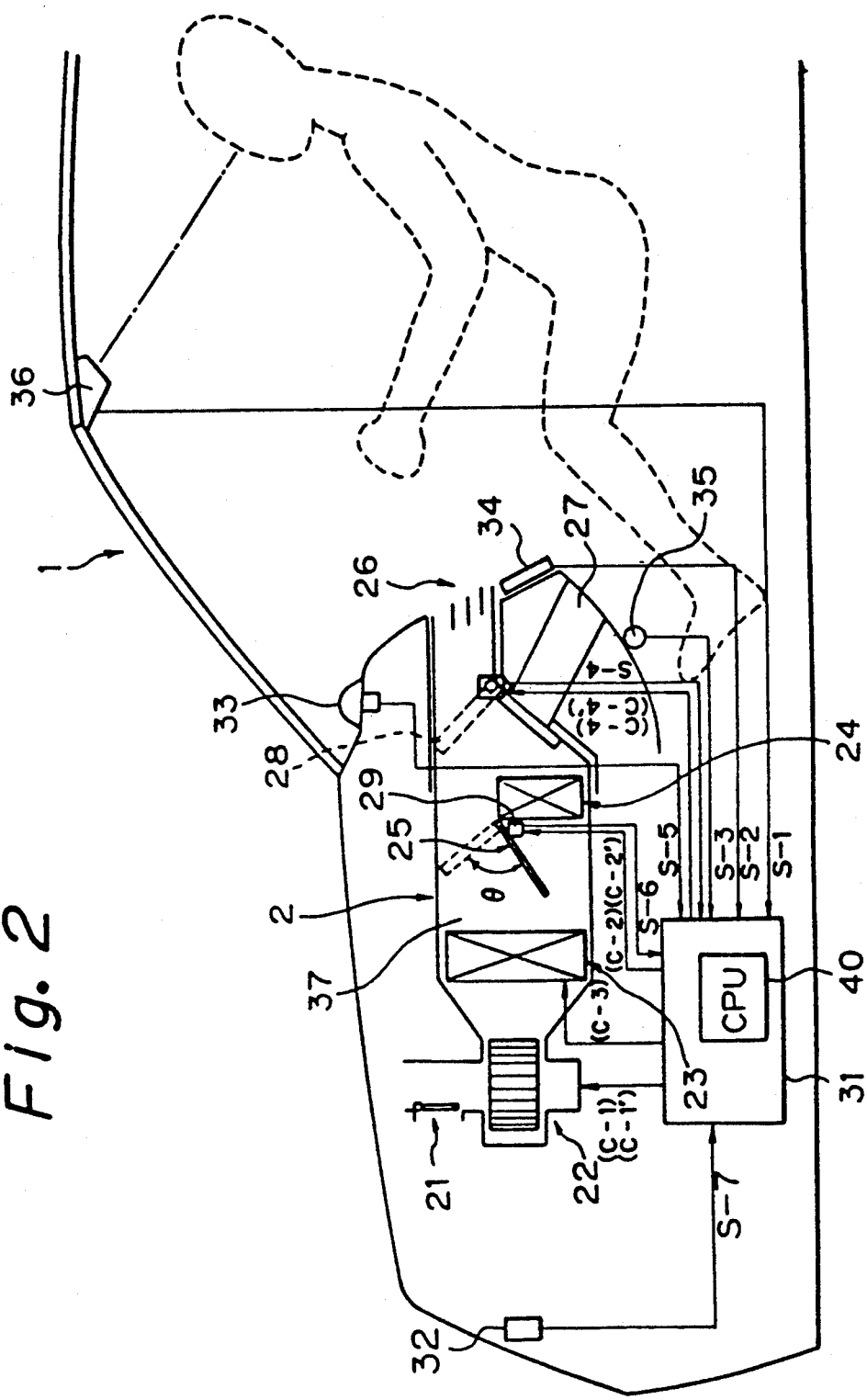

CONTROL APPARATUS FOR AIR-CONDITIONING

BACKGROUND OF THE INVENTION

1. Field of the Invention

This invention relates to a control apparatus for an air-conditioner for performing air-conditioning in a room taking into consideration the perceived temperature of persons in the room.

2. Description of the Related Art

A conventional control apparatus for an air-conditioner usually controls the blower motor, the damper for switching between inside and outside air, the air mixing damper, etc. to determine the required blowing temperature of the room air temperature in accordance with the actual room temperature and the temperature setting to maintain the actual room temperature at the temperature setting.

Such a system attempts to constantly realize comfortable air-conditioning in a room or in a car by correcting the set blowing temperature, taking into consideration the outside temperature and the amount of heat from the sun. With a conventional apparatus, the determination of the required blowing temperature or the determination of the target room temperature and other air-conditioning control, is based only on environmental conditions such as the outside temperature and heat from the sun. Therefore, it is difficult to say that the comfort requirements of passengers are precisely reflected. This is due to the fact that with a conventional apparatus, the comfort conditions of passengers in a car are not clearly detected.

In a conventional apparatus, apart from the idea of controlling only the temperature of the blown air, it is usual to use a system which sets the amount of air blown in accordance with the deviation between the room temperature and the temperature setting. The amount of air blown may also be based on the deviation between the room temperature and the temperature setting, to supply a large amount of air when the deviation is large and a small amount when small.

Even with such a system, however, it is difficult to say that the control of air blown can supply a comfortable amount of air. The temperature sensation, which is an important factor of comfort, is influenced not only by temperature but also by the air flow, humidity and heat from the sun as well as human factors; such as the amount of movement and clothes.

In order to deal with the defects of the prior art, the inventors considered to perform room air-conditioning by paying attention to the following facts:

(1) There is a strong relationship between the skin temperature of persons in a room and their perceived temperature sensations (hot and cold feeling).

(2) Under abnormal conditions, the room air-conditioning most comfortable for persons in a room is one where they feel cool when their skin temperature is high and where they feel hot when their skin temperature is low.

It has been confirmed through experiments that in order to realize conditions of non-sensation of temperature mentioned above, the factors of persons in the room such as the amount of their movement (amount of metabolism) and amount of clothes worn should be taken into consideration in addition to environmental conditions such as temperature, humidity, air flow, and heat from the sun. As a result of experiments, it has been found that the skin temperature of persons in a room corresponds to the conditions of non-sensation mentioned above and determined by all factors, including the environmental factors and the factors of the person in the room as stated above. This means that if air-conditioning is controlled based on skin temperature, it is not necessary to take into consideration the effects of room size and thermal load, which are problems with conventional air-conditioning technologies.

As mentioned above, it is possible to determine the temperature sensation of the persons in the room under normal conditions from their skin temperature. It is necessary, however, to take into consideration not only the skin temperature but also the rate of change of skin temperature over time under non-stable conditions of room temperature from immediately after persons enter the room until their skin temperature stabilizes. This may be expressed by the following equation $$S = K_1 \times T_S + K_2 \times \dot{T}_S + C \tag{1}$$

where, $K_1$, $K_2$, $C$: Constants $T_S$: Skin temperature $\dot{T}_S$: Rate of skin temperature change As shown above, the temperature sensation changes along with the skin temperature.

In order to make air-conditioning comfortable, it is necessary, to control the room air conditioning taking into consideration the skin temperature (perceived temperature) of persons in the room.

Moreover, if a control apparatus for an air-conditioner controls the amount of air blown as in the conventional apparatus, persons in the room may feel uncomfortable while: the skin temperature is in the process of reaching a comfortable temperature; or after it reaches a comfortable temperature and the relationship between the temperature, sensation and skin temperature and the relationship with the amount of air blown are not taken into consideration at all.

Also, in conventional apparatus there was a problem of persons feeling uncomforatable due to the noise of air being blown and the air flow even if satisfied with the temperature sensation, especially when the amount of air blown was excessive.

Therefore, it is necessary to supply the amount of air in response to the temperature sensation, which changes along with the skin temperature.

SUMMARY OF THE INVENTION

Unlike with a conventional control apparatus for an air-conditioner which simply sets a target value in advance, such as the room temperature or the amount of air blown, and controls the air-conditioner so that the present room temperature or the amount of air blown is in line with the target value, the object of this invention is to provide a control apparatus for an air-conditioner which is capable of constantly controlling the temperature and the amount of air blown for comfort. The present invention takes into consideration the correlation between the temperature sensation and skin temperature and incorporates such factors into the control system.

With a conventional system which does not take into consideration the rate of change of skin temperature, the room temperature is controlled only in response to the skin temperature. It was therefore possible only to lower the blowing temperature when the skin temperature was high or to raise it when low.

Even with the same skin temperature, persons in the room feel relatively warm when their skin temperature is rising or relatively cold when it is falling. The conventional system was incapable of coping with such a phenomenon.

This invention, therefore, aims to provide a control apparatus for an air-conditioner which brings the temperature sensation of persons in a room into line with the target temperature sensation, to the highest possible extent, by controlling the temperature based on the rate of change in the skin temperature.

Therefore, the present invention provides a control apparatus for an air-conditioner provided with flow controlling means which controls the amount of air blown into a room, a temperature control means which controls the temperature of air blow, a skin temperature detecting means which detects the actual skin temperature of persons in the room, a temperature sensation determining means which determines the actual temperature sensation of persons in the room in accordance with the skin temperature detected above and the rate of change of this detected skin temperature, and an electrical control means which makes the flow control means bring the temperature sensation determined above into line with the target temperature sensation and which makes the temperature control means perform temperature control.

DESCRIPTION OF THE DRAWINGS

FIG. 2 is a sectional view of a device to realize an embodiment of this invention;

DESCRIPTION OF THE PREFERRED EMBODIMENTS

Below, embodiments of a control apparatus for an air-conditioner of this invention are described in detail with reference to the drawings.

In the following embodiments, a control apparatus for an air-conditioner for cars is used for the description. However, this invention is applicable not only to a control apparatus for an air-conditioner for cars, but also to control apparatuses for air-conditioners for any closed space into which and from which persons enter and exit.

Figure 1:
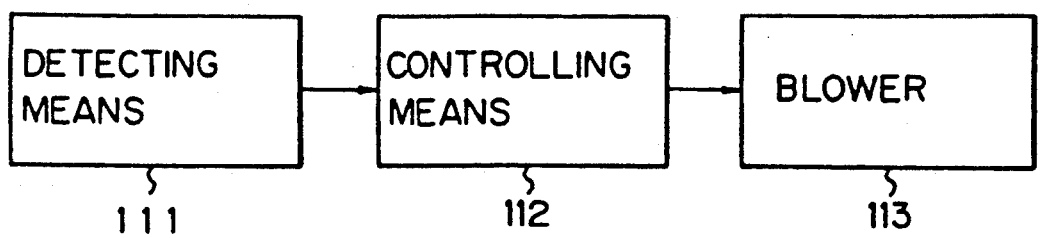
FIG. 1 is block diagram of the basic construction of an embodiment of a control apparatus for an air-conditioner of the present invention.

FIG. 1 is a block diagram of the basic technical construction of a first aspect of this invention.

This embodiment is composed of a control means 112, which determines an amount of air flow in response to skin temperature detected with a temperature detecting means 111 and a target skin temperature to achieve a comfortable target temperature sensation, and a blower 113 which is controlled by the control means 112.

FIG. 2 shows a schematic cross-section of an air-conditioner for vehicles showing a construction for realizing this embodiment.

In this embodiment, the vehicle 1 is provided with an air-conditioning unit 2. The air-conditioning unit 2 has a generally known construction, and is composed of an inside/outside air switching device 21, a blower 22, an evaporator 23, heater core 24, an air mixing damper 25, vent blowing outlets 26 and 27, and a switching damper 28 to switch the outlets.

A control device 31 which controls this air-conditioning unit 2 is provided with a microcomputer. This microcomputer receives signals from a outside air temperature sensor 32, a solar radiation sensor 33, a switch panel 34, a room temperature sensor 35, an infrared skin temperature sensor 36, and an opening sensor 29 (which shows the opening of the air mixing damper 25). The control device 31 calculates the signals received from the sensors mentioned above to control the air blower 22 and the opening of the air mixing damper 25. The control device controls the damper 28 to switch air blown between the outlets 26 and 27. Normally, it controls the damper 28 so that air comes out from the outlet 26 during cooling (ventilation mode) and from the outlet 27 during heating (heating mode).

The infrared skin temperature sensor detects the skin temperature from the face without touching the face. It indirectly measures the skin temperature and outputs an estimated value.

In the above-mentioned construction of this embodiment, the signals detected by the sensors are converted from analog to digital signals and entered into the microcomputer of the control device where they are stored for calculations mentioned below. Finally, the control device 31 calculates the amount of temperature control and the amount of air blown in response to the skin temperature.

In this embodiment, the amount of air blown is calculated in accordance with the temperature difference $\Delta T_s$ of the skin temperature expressed by Equation (2) below:

$$\Delta T_s = T_s - T_s' \tag{2}$$

where, $T_s$: Present skin temperature of passengers $T_s'$: Skin temperature under normal conditions to achieve a target temperature sensation.

Here, $T_s'$ is determined from Equation (3) below, with S made a target temperature sensation S' and $T_s=0$ (under normal conditions) in Equation (1).

$$T_s' = (S' - C)/K_1 \tag{3}$$

Here, the amount of air blown, to be calculated in accordance with $\Delta T_s$, is a patterned value obtained by the experiment described below.

The experiment was set up to obtain a pattern of the amount of air blown. $\Delta T_s$ stated above was changed and the amount of air blown at which the passengers felt comfortable was recorded for each $\Delta T_s$.

Figure 3:
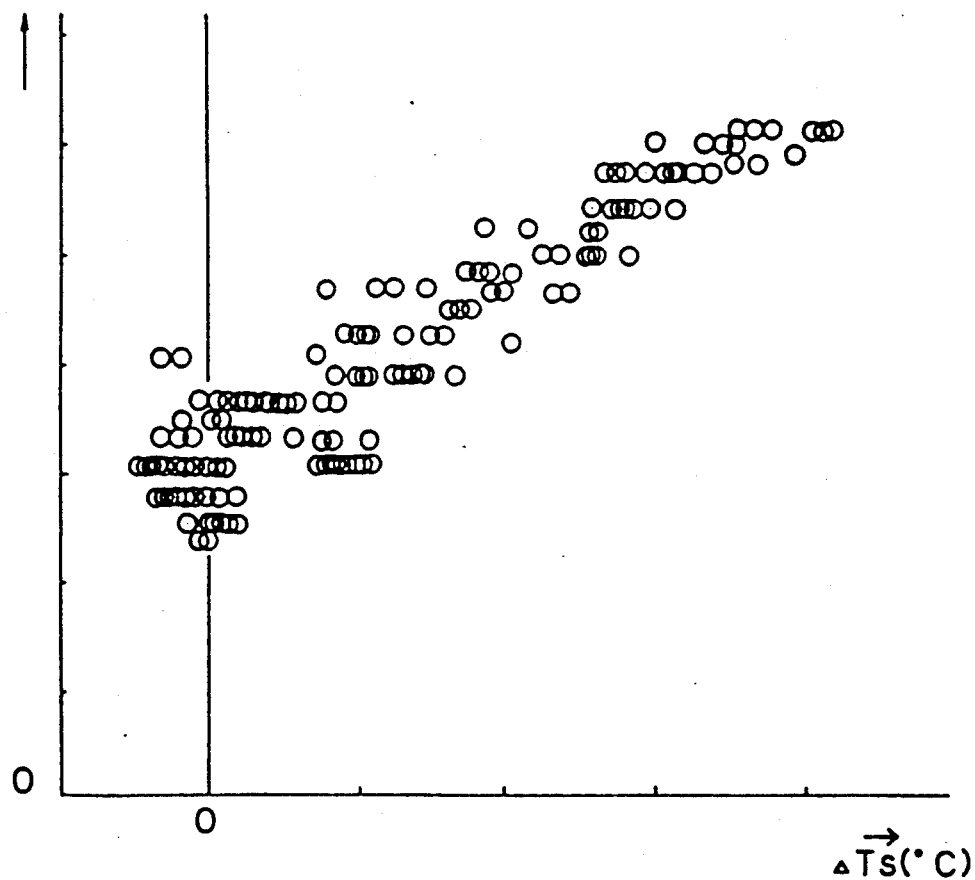
FIG. 3 is a graph of the relationship between the skin temperature $\Delta T_s$ and the air flow V in the above-stated embodiment.

The results of the experiment are shown in FIG. 3. The graph shows that passengers prefer a smaller amount of blown air as $\Delta T_s$ gets smaller.

Figure 4:
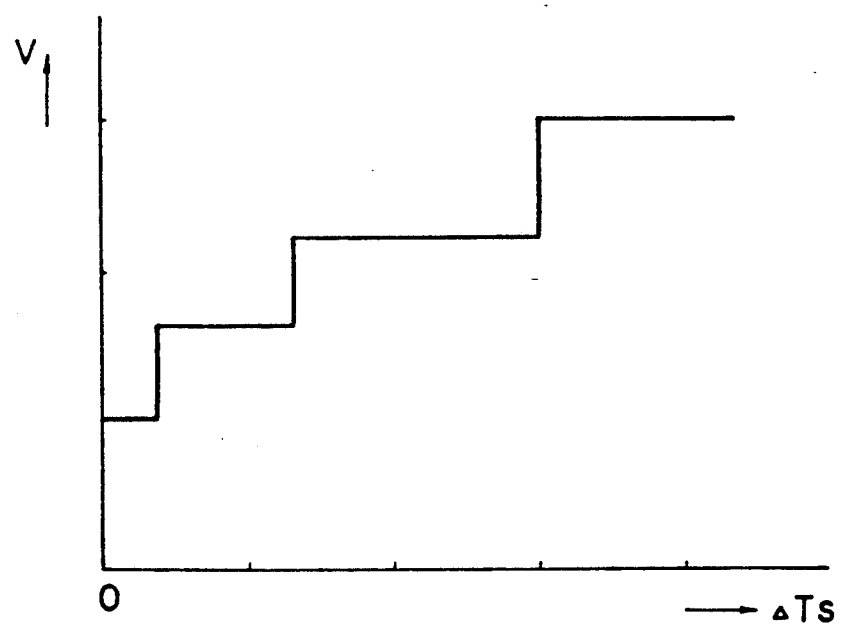
FIG. 4 is a graph of the pattern of air flow according to FIG. 3.

In this embodiment, pattern of air blown as shown in FIG. 4 is stored in the control device. The device calculates the amount of air blown from this pattern and $\Delta T_s$.

Next, the operation of this embodiment is described. This embodiment shows a cooling operation as an example.

Figure 5:
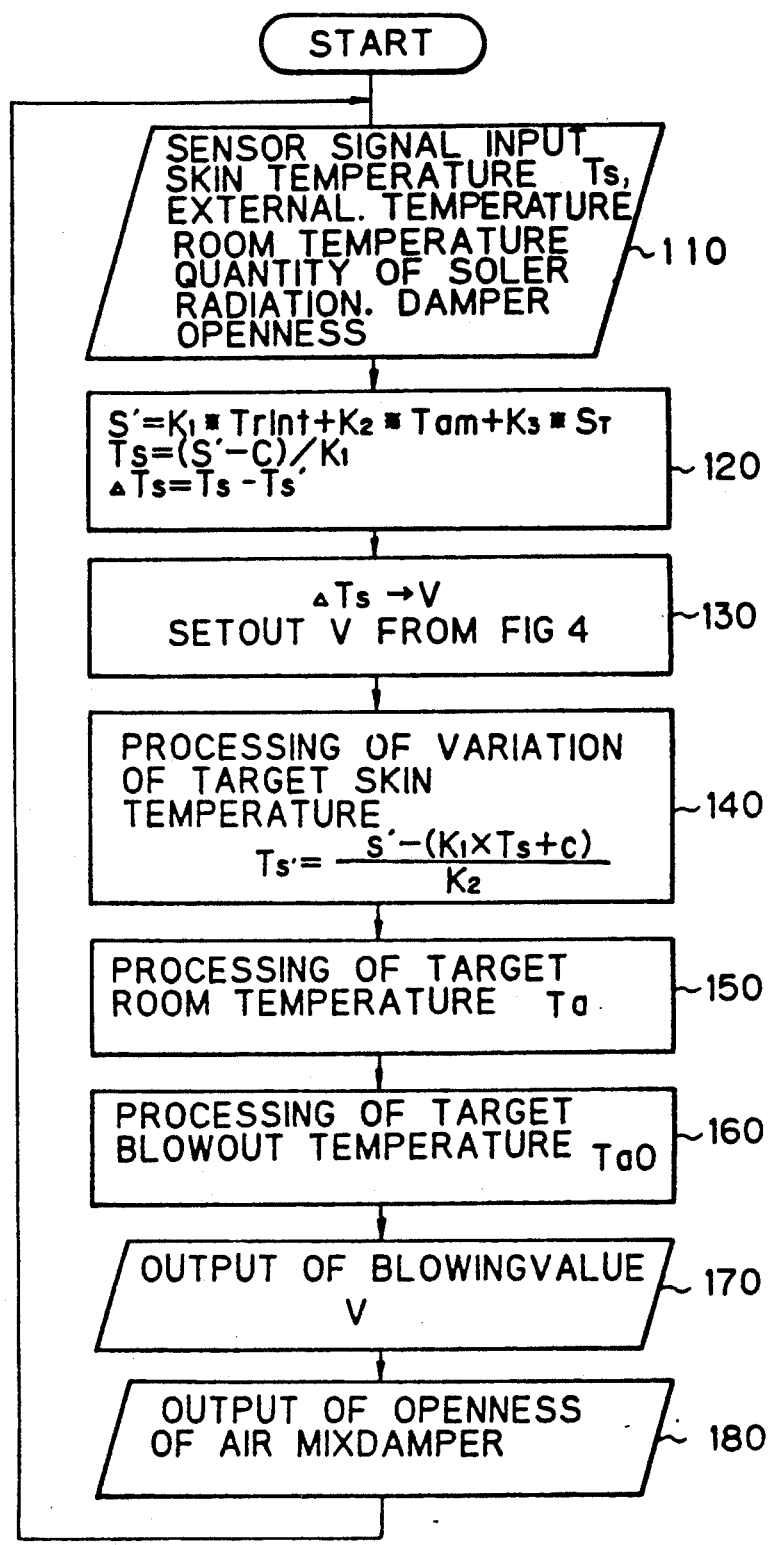
FIG. 5 is a flow chart to realize an embodiment of the present invention.

The control device 31 gets its power supply from the battery of a vehicle (not shown), executes the processing of the flow chart of FIG. 5 in response to the operation of a key switch (not shown), and controls the room temperature and the amount of air flow.

At step 110, the signals detected with the sensors are entered. Especially, the skin temperature of passengers $T_s$ is entered from the skin temperature sensor 36.

Next, at step 120, a target skin temperature $T_s'$ is calculated.

Figure 6:
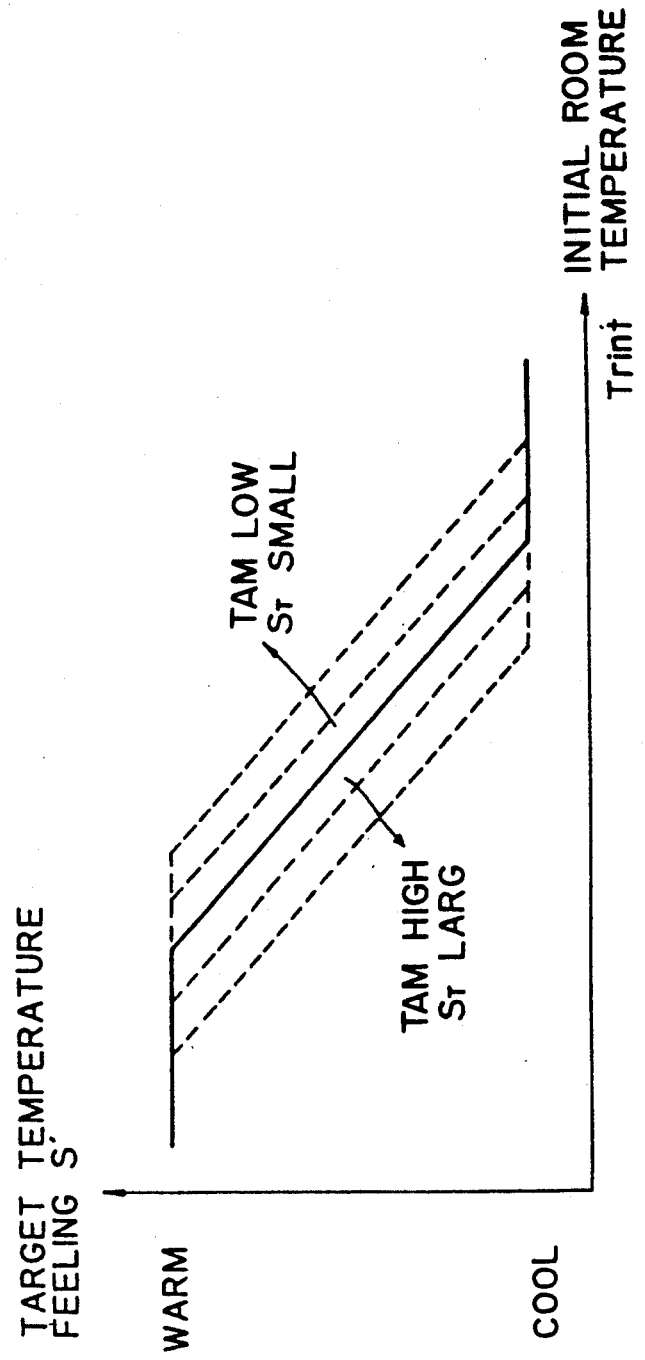
FIGS. 6 to 10 are graphs which explain an operation of the above-stated embodiment.

Here, the target temperature sensation $S'$ corresponds to a temperature sensation of "warm" and "cold" which is converted into numbers. In Equation (4) below, S is calculated to show the characteristics as shown in FIG. 6.

$$S' = K_3 \times T_{rint} + K_4 \times T_{am} + K_5 \times S_T + C \tag{4}$$

where, $K_3$, $K_4$, $K_5$, C: Constants $T_{rint}$: Room temperature at the beginning of air-conditioning (initial temperature)

$T_{am}$: Outside temperature $S_T$: Amount of heat from the sun

In this embodiment, $T_{rint}$ is a vehicle compartment temperature stored when the key switch is turned on.

With Equation (4), a target temperature sensation $S'$ is set with the thermal load to which passengers are exposed before air-conditioning starts and the condition of the thermal load in the room as factors.

This target temperature sensation is corrected by a passenger making an entry on the switch panel 34 to the effect "to make it hotter" or "to make colder."

Then, the difference $\Delta T_s$ between the skin temperature $T_s$ and the target skin temperature $T_s'$ entered at step 110 is obtained.

At step 130, the amount of air blown V is determined on the basis of $\Delta T_s$ obtained at step 120 and the pattern of air blown shown in FIG. 4.

At step 140, the rate of changes changes in the target skin temperature $\dot{T}_s'$ is calculated from Equation (5) which is converted from Equation (1).

$$\dot{T}_s' = \frac{S' + (K_1 \times T_s + C)}{K_2} \tag{5}$$

Equation (5) indicates that the target temperature sensation $S'$ can be obtained by changing the skin temperature $\dot{T}_s'$ from the present skin temperature $T_s$.

At step 150, a target vehicle compartment temperature $T_a$ which gives the rate of the target skin temperature change $\dot{T}_s'$ under the amount of air blown V determined at step 130 is calculated.

In this embodiment, a model of a human body in a vehicle compartment is established to simulate the relationship between the vehicle compartment temperature $T_a$ and the change in the target skin temperature $\dot{T}_s'$ under the vehicle compartment environment, which change is based on the amount of solar radiation, the amount of air blown, etc. At step 150, a target vehicle compartment temperature which gives a target skin temperature change $\dot{T}_s$ is calculated on the basis of the results of this simulation.

At step 160, a target air blow temperature Tao which gives the target vehicle compartment temperature $T_a$ is calculated. At step 170, control signals are output to the blower 22 to give the amount of air blown determined at step 130. At step 180, signals to control the opening of the air mixing damper 25 are output to realize the target air blow temperature Tao to achieve the target vehicle compartment temperature $T_a$ set at step 150.

Sensor signals are updated at each sampling time to repeat the series of controls.

According to the embodiment described above, it is possible to achieve a vehicle room temperature to give a target temperature sensation under the amount of air flowing in correspondence to the skin temperature of passengers. It is thus possible to give a desired temperature sensation to passengers under the amount of air flow based on the temperature sensation of the passengers.

In the embodiment described above, an infrared skin temperature sensor 36 is used, but a sensor which directly detects the skin temperature of passengers in a vehicle may also be attached.

Also, an estimated skin temperature sensor may be used. Numerous constructions of such estimated skin temperature sensors are known. Such a sensor outputs an estimated value of skin temperature under environmental conditions such as the vehicle compartment temperature, air flow, humidity, and heat from the sun and is provided with a structure which estimates the heat generated from the human body and heat from the sun.

The pattern of air blowing may be set as a continuous pattern corresponding to the results of the experiment shown in FIG. 3 in addition to a step-pattern as shown in FIG. 4.

In the embodiment described above, the amount of air blown is determined on the basis of $\Delta T_s$ calculated from Equation (2). This value may be any value which changes along with the temperature sensation of the human body.

For example, the amount of air blown V may be calculated from Equation (6) below, using the rate of skin temperature changes $\dot{T}_s$, while control of the amount of air blown of another mode as an index.

$$V = K_6 \times \dot{T}_s \tag{6}$$

where, $K_6$: Constant

Figure 7:
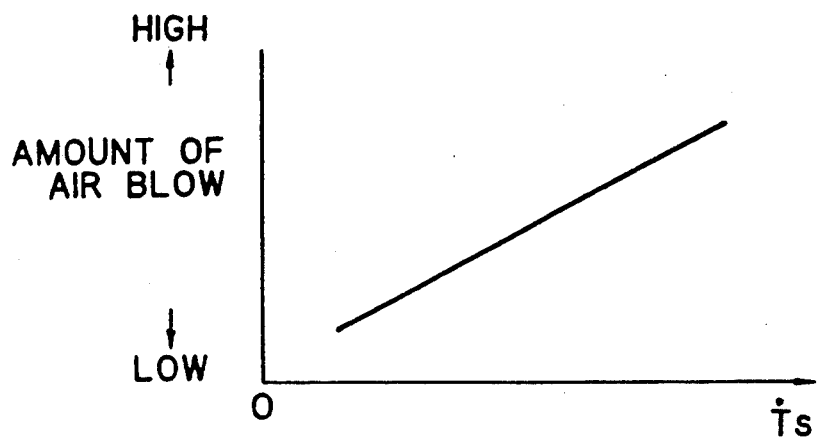

Here, $\dot{T}_s$ is obtained as $\dot{T}_s = \dot{T}_s'$ by performing the calculation of step 140. With this pattern of air blown the reference is 0 as shown in FIG. 7. The amount of air blown becomes lower as it approaches 0.

Also, the amount of air blown V may be determined from Equation (7) using the skin temperature $T_s^*$ which should be generated at the next sampling time and the present skin temperature.

$$V = K_7 \times (T_s - T_s^*) = K_7 \times (-\dot{T}_s \times \Delta T) \tag{7}$$

where, $K_7$: Constant $\Delta T$: Sampling time

Equation (7) indicates that $(T_s - T_s^*)$ is the same value as $(-\hat{T}_s \times \Delta T)$. (i.e. $T_s^*$ is an estimate of the future skin temperature that will be detected at the next sampling time.)

Figure 8:
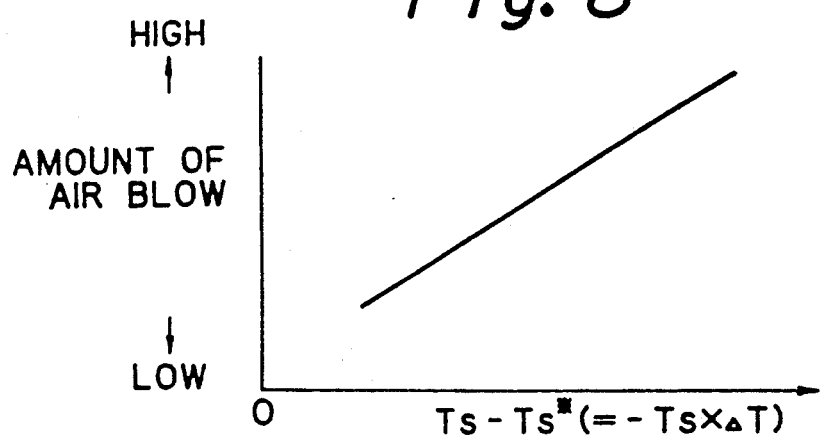

In control based on this index, the calculation of step 140 is performed at step 120 to obtain $\hat{T}_s$. Next, $(-\hat{T}_s \times \Delta T)$ is calculated to get $(T_s - T_s^*)$, which is used as an index. The characteristic of this index is such that as it approaches the reference 0, the amount of air blown is reduced as shown in FIG. 8.

The skin temperature $T_s$ to be detected may be directly used to determine the amount of air blown V from Equation (8).

$$V = K_9 \times T_s \tag{8}$$

Figure 9:
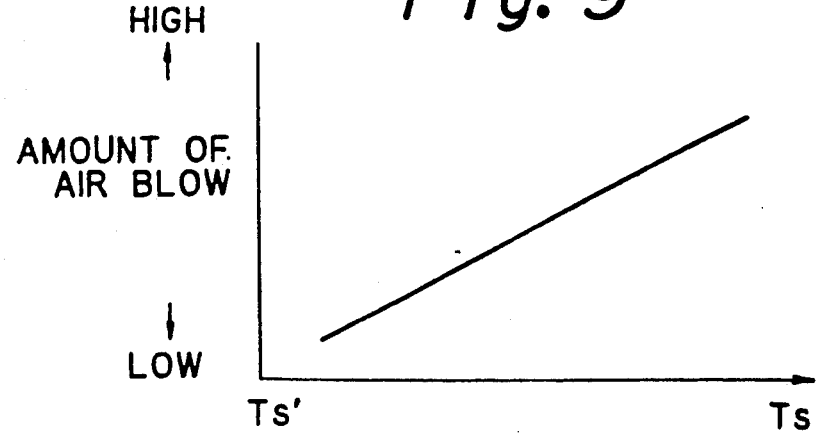

With this index, $T_s'$ is obtained at step 120 as in FIG. 5, and the amount of air blown is determined with the skin temperature $T_s$ instead of the target skin temperature $T_s'$ until $T_s$ becomes $T_s'$. The characteristics are shown in FIG. 9.

In the embodiment mentioned above, only the operation under cooling is described. Under heating, it is possible to calculate the amount of air blown corresponding to the skin temperature index. Under heating, it is also possible to perform calculations with each index as an absolute value in Equations (2), (6), and (7); and to perform calculations with symmetry around the vertical axis of FIG. 9 ($\approx T_s'$) in $T_s$ of Equation (8) in order to set a pattern of air blown under heating.

Figure 10:
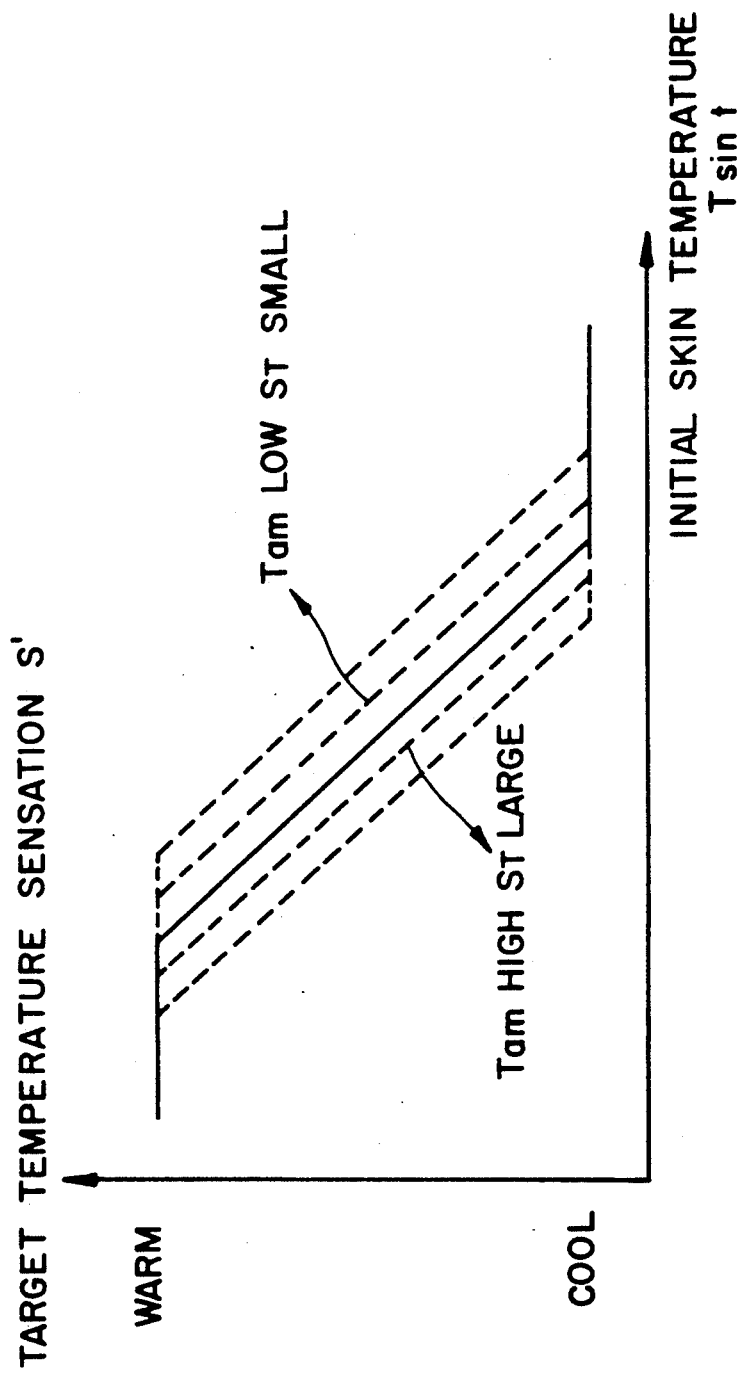

Also, a target perceived temperature sensation S' may be set on the basis of Equation (9) below to show the characteristics shown in FIG. 10.

$$S' = K_3' \times Tsint + K_4' \times Tam + K_5' \times S_T + C \tag{9}$$

where, $K_3'$, $K_4'$, $K_5'$, $C'$: Constants

Tsint: Skin temperature at the beginning of air-conditioning (initial skin temperature)

Tam: Outside temperature $S_T$: Amount of heat from the sun

In Equation (9), an initial skin temperature Tsint is used instead of an initial room temperature Trint. It is possible to set a target temperature sensation S' taking into consideration the thermal load to which persons in a room are exposed, the amount of movement, and the thermal load in the room before air-conditioning starts.

In addition to Equation (4) or (9), all of Trint, Tsint, Tam, and $S_T$ may be used in setting a target temperature sensation S'.

For instance, on the basis of the skin temperature at the beginning of air-conditioning, which is determined as a result of the thermal load to which passengers are exposed before getting into a vehicle, the amount of their movement, the in-vehicle environment immediately after they get into it, and the thermal load in the vehicle compartment, a target temperature sensation S' may be determined by making corrections to the initial temperature Trint, outside temperature Tam, and the amount of solar heat $S_T$.

The target temperature sensation S' need not be a constant value after the room temperature and skin temperature are stabilized. It may be changed cyclically or randomly to improve comfort.

Figure 11:
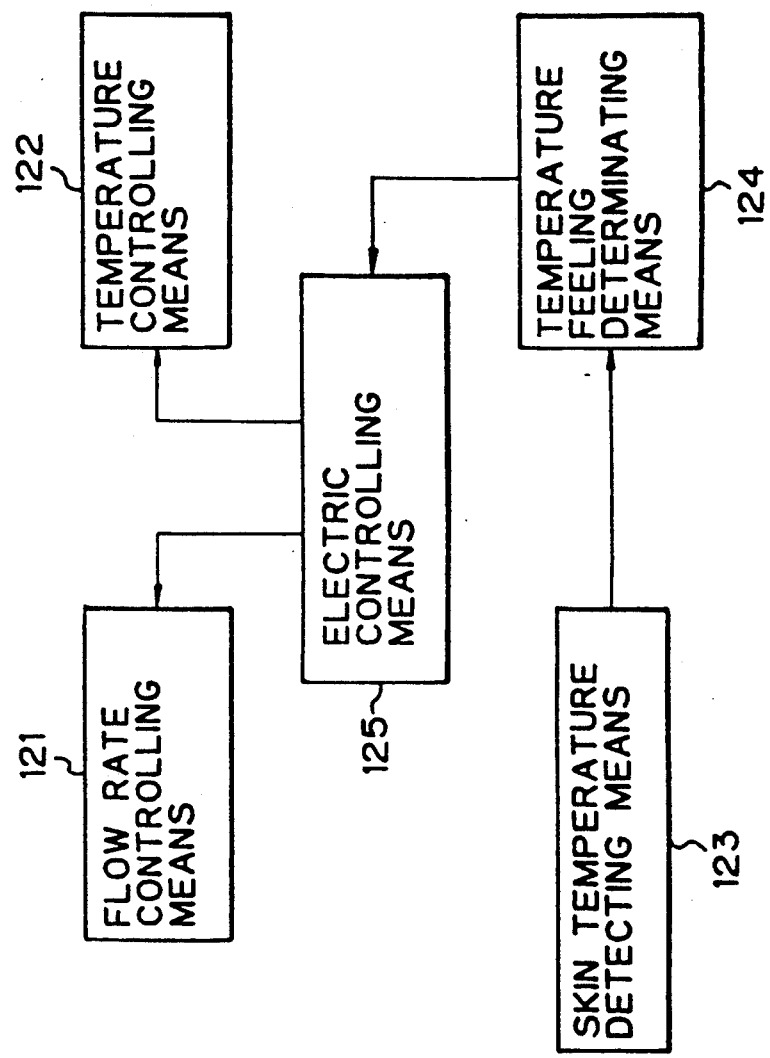
FIG. 11 is a block diagram of the construction of an embodiment of the same invention considered from a more specific standpoint.

FIG. 11 is a block diagram of the construction of a control apparatus for an air-conditioner of the same invention but considered from a more specific standpoint. In this embodiment, a skin temperature detecting means 123 detects the actual skin temperature of passengers in a vehicle. A temperature sensation determining means 124 determines the actual temperature sensation of passengers on the basis of the thus detected skin temperature and the rate of change of this detected skin temperature or the thermal history of the actual skin temperature. An electrical control means 125 controls the flow of the flow control means 121 and the temperature of a temperature control means 122 so that the temperature sensation determined above comes into line with a target temperature sensation.

The microcomputer 40 makes calculations necessary to generate signals (c-1 through c-4) necessary to control the operation of the blower 22, the evaporator 23, the air mixing damper 25, and the switching damper 28, while executing the program shown in FIG. 5.

An ignition switch IG (not shown) is turned on first to start the vehicle engine and to activate the microcomputer 40. Then control signals from the controlling switch 34 and the microcomputer 40, generates low speed mode output signals (c-1) to drive the blower 22 in a low speed mode and driving output signals (c-3) to start driving of the driving circuit of the evaporator 23.

Then, the blower 22 is driven in a low speed mode on the basis of the low speed mode output signals (c-1) from the microcomputer 40 to introduce an air flow corresponding to the low speed mode into the air duct 30. In response to the driving output signals from the microcomputer 40, a compressor connected to the evaporator supplies a compressed coolant to the evaporator 23. The air flow introduced by the blower 22 is cooled by the evaporator 23 and flows into the heater core 24 in an amount corresponding to the actual opening $\theta$ of the air mixing damper. The remaining cooled air flow flows into the back of the heater core 24 to be mixed with the heated air flow.

The value of the outside temperature digital signal from the outside temperature sensor 32, the value of the skin temperature digital signals from the skin temperature sensor 36, and the value of the opening digital signals from the opening digital sensor 29 are entered as an outside temperature Tam, skin temperature $T_s$, and opening $\theta$, respectively, into the microcomputer 40. Also, the in-vehicle temperature from temperature sensor 35 is entered.

When the digital signals from the individual sensors mentioned above are entered into the microcomputer 40, as explained above, an actual temperature sensation S of passengers, a target skin temperature sensation S', a rate of change of skin temperature sensation of passengers $\hat{T}_s$, and a skin temperature under normal conditions to achieve the target skin temperature of passengers $T_s'$, are calculated and output. As a means to set the above-stated target temperature sensation, a circuit may be provided in the above-stated microcomputer to calculate, for instance, $S' = K_1 \times Trint + K_2 \times Tam + K_3 \times S_T + C$, as described above.

Next, the difference $\Delta T_s (\Delta T_s = T_s - T_s')$ between the target skin temperature of passengers $T_s'$ and the actual skin temperature of passengers is calculated to judge the relationship between $T_s$ and $T_s'$.

If each of the above-mentioned operations is performed by a driver M who has been in a cold winter environment for a while and then gets into the vehicle. Both the outside temperature Tam and the skin temperature $T_s$ are low. A judgement is made to be $T_S < T_S'$
and it is necessary to run the program to raise the in-vehicle temperature. Toward that end, for instance, the computer 40 generates heat mode output signals (c-4) to switch the air blow outlet switching damper 28 to the first switching position, i.e., to the heat mode.

The damper driving circuit is driven to switch the air blow outlet switching damper 28 to the first switching position. Then, the mixed air flow after the heat core 24 is blown out onto the legs of the driver M. As a result, this is a heat mode.

Then, the microcomputer 40 compares the actual skin temperature sensation of passengers S and the target skin temperature sensation S'. In the embodiment, $S \neq S'$ and $S < S'$. The computer therefore judges it necessary to raise the air blow output temperature. It first judges if the opening $\theta$ of the air mixing damper 25 is at maximum ($\theta = \theta_{max}$). If it is not a maximum, the microcomputer 40 generates opening output signals (c-2). As the opening output signals (c-2) are generated by the microcomputer 90, the air mixing damper drive circuit (not shown) is driven to increase the actual opening of the air mixing damper 25. With this, the amount of cooled air flow into the heater core increases to raise the temperature of the mixed air flow blown out into the vehicle compartment.

After the opening $\theta$ of the damper 25 reaches maximum, it is desirable that the mode of the blower 22 be changed to a high speed operation mode from a low speed operation mode. Toward that end, the microcomputer 40 generates high speed mode output signals (c-19) to change the operating mode to a high speed mode. Then, the blower 22 is driven in a high speed mode on the basis of the high speed mode output signals (c-1) from the microcomputer 40 to introduce the air flow, corresponding to the high speed mode, into the air duct 37 and to blow out air into the vehicle compartment from the blow outlet 27, as above.

In the above, if the temperature of the mixed air flow to be blown out into the vehicle compartment, corresponding to the actual opening of the air mixing damper 25, is Ta1 and the velocity of the mixed air flow to be blown out into the vehicle compartment is V, then the actual temperature sensation S is expressed by Equation (10) by its relationship with proportional constants $\alpha$ and $\beta$, the blow out temperature Ta1, and the blow out velocity v:

$$S = \alpha Ta1 + \beta v + \tau \qquad (10)$$

Here, $\tau$ represents a constant. If $\alpha$ and $\beta$ are set so that $\alpha > \beta$, it is seen that the temperature sensation S is more influenced by Ta1 and $\beta v$. In this embodiment, therefore, under an assumption of $\alpha > \beta$, the opening of the air mixing damper 24 is regulated to a considerable extent in accordance with $\alpha$. After reaching $\theta = \theta_{max}$, the increase in the amount of air flow introduced into the blower 22 is regulated to a small extent in accordance with $\beta$ so that the temperature sensation of the passengers S rapidly approaches the target temperature sensation S'. With this, the temperature of air flow into the vehicle compartment changes with the actual opening of the air mixing damper 25 $\theta = \theta_{max}$ and with the high speed mode of the blower 22 maintained. Under such circumstances, when S=S', the microcomputer enters a standby state as it judges that the computer program has moved from an air-conditioning state to a semi-stable state.

The above description of operation refers to heating control in the winter. Essentially the same applies to cooling control when a driver who has been in a hot environment for a while enters the vehicle. To be more specific, the microcomputer 40, judging $T_S > T_S'$, generates ventilation mode signals (c-4') to switch the air blow outlet switching damper 28 to the second switching position (ventilation mode). With this, the air blow outlet switching damper 28 is switched to the second switching position. Then, the mixed air flow after the heat core 24 blows out towards the head of the driver. As result, the operation becomes a ventilation mode.

The microcomputer 40 compares the above-stated temperature sensation S and the target temperature sensation S'. Microcomputer 40 judges it necessary to lower the temperature of the air flow as $S \neq S'$, and $S > S'$ and judges whether the opening of the air mixing damper 25 is minimum, i.e., $\theta = \theta_{min}$. If not at the minimum, it generates opening output signals (c-2') to reduce the opening of the air mixing damper 25. With the opening output signals (c-2), the actual opening of the air mixing damper 25 is reduced. With this, the amount of cold air flowing into the heat core 24 decreases to lower the temperature of the mixed air to be blown out into the vehicle compartment 10.

After the opening $\theta$ of the damper 25 reaches the minimum opening, it is desirable to switch the blower 22 to the high speed mode operation from the low speed operation mode. Toward that end, the microcomputer 40 generates high speed mode output signals (c-1') to switch the blower 22 to a high speed operation mode. Then, the blower 22 is driven in a high speed operation mode on the basis of the high speed operation mode output signals from the microcomputer 40 to introduce an air flow corresponding to the high speed operation mode into the air duct 37. Air is thus blown out into the vehicle compartment through the outlet 26 essentially in the same manner as above.

As described above, the temperature of air to be blown out into the vehicle compartment changes with the actual opening of the air mixing damper 25, $\theta = \theta_{min}$, and with the blower 22 maintained in a high speed operation mode. Under such circumstances, if S=S', the microcomputer 40 enters a standby state for the next change in conditions, judging that the computer program has moved to a stable state from the semi-stable state mentioned above.

In this embodiment, the actual skin temperature of passengers and its rate of change are always taken into consideration in determining the actual temperature sensation of passengers. The amount of air to be blown out and its temperature are controlled so that the temperature sensation determined comes into line with a target temperature sensation. Cooling or heating of the vehicle compartment is performed to maintain a proper temperature sensation of passengers from a non-stable state to a stable state even after persons in a hot summer environment or a cold winter environment enter a vehicle. In another embodiment of the control apparatus, it is made possible to estimate the rate of change in the skin temperature of passengers and automatically correct the in-vehicle target temperature.

Figure 12:
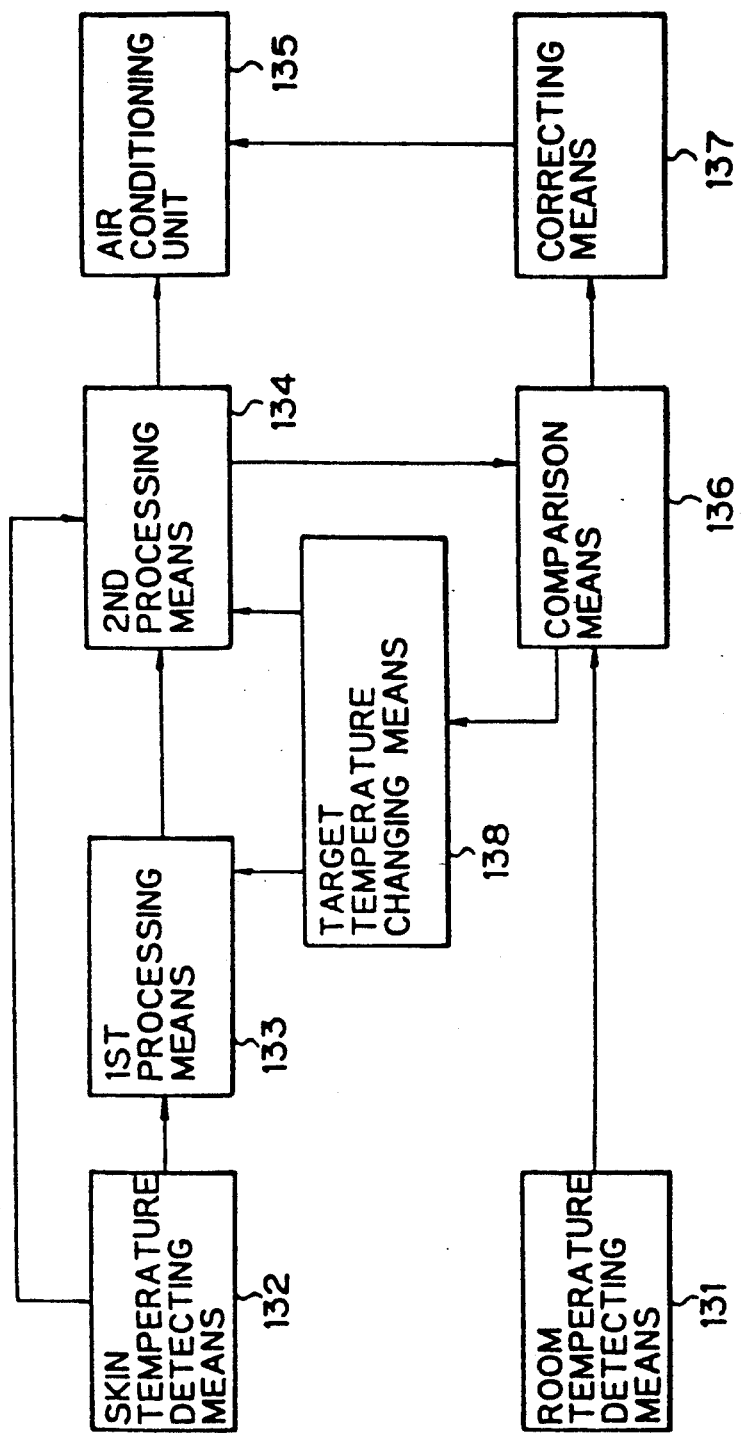
FIG. 12 is a block diagram of the construction of an embodiment of the same invention considered from still another standpoint.

As shown in the block diagram of FIG. 12, this embodiment is provided with a skin temperature detecting means 132 to detect the skin temperature of passengers, a vehicle compartment temperature detecting means 131 to detect the vehicle compartment temperature, a first calculating means 133 to calculate the rate of change of an optimum skin temperature on the basis of the skin temperature detected with the above-stated skin temperature detecting means 132, a second calculating means 134 to calculate a target vehicle compartment temperature on the basis of the skin temperature detected by the above-stated skin temperature detecting means 132 and the rate of change of an optimum skin temperature calculated by the above-stated first calculating means 133, an air-conditioning unit 135 to control the vehicle compartment temperature with the signals from the above-stated second calculation means 134, a comparing means 136 to compare the vehicle compartment temperature detected by the above-stated vehicle compartment temperature detecting means 131 and the target vehicle compartment temperature calculated by the above-stated second calculation means for specified time, a correcting means 137 to correct control of the above-stated air-conditioning unit on the basis of the results of comparison by the above-stated comparing means 136, and a target temperature changing means 138 to make the above-stated first and second calculating means 133 and 134 perform the calculation again.

The first and second calculating means, the comparing means, the correcting means, and the target temperature changing means used in this embodiment are all contained in the microcomputer 40 shown in FIG. 2.

In this embodiment the relationship between the skin temperature $T_s$ and the temperature sensation S is used. As stated above, the temperature sensation S under an abnormal state is explained using Equation (1).

In a common control apparatus for an air-conditioner, two variables of wind velocity v and temperature T exist. If the wind velocity of the blower is made constant, temperature is the only variable, and thus the rate of change of skin temperature $T_s$ can be estimated from Equation (11) below. If the skin temperature is $T_s$, $$\dot{T}_s = \{S - (K_1 \times T_s + C)\}/K_2 \quad (11)$$

where, S is the temperature sensation of passengers, which may be set at any value.

Next, the operation of this embodiment is described. The temperature data detected by the skin temperature sensor 36 and the vehicle compartment temperature sensor 35 is entered into the microcomputer 40, which performs the calculation described above. On the basis of the results of the calculation, it sends control signals to the air-conditioning unit 135. This then controls the vehicle compartment temperature on the basis of the control signals.

When necessary data is sent to the microcomputer 40 from the sensors mentioned above, the rate of change of the skin temperature of passengers $T_s$ is calculated on the basis of Equation (11) above. Next, a target vehicle compartment temperature $T_a'$ is calculated from Equation (12) below.

$$T_a' = (\dot{T}_s - K_{10} \times T_s)/K_{11} \quad (12)$$

where, $K_{10}$, $K_{11}$ are constants.

Then, control signals corresponding to the target vehicle compartment temperature $T_a'$ are sent to the driving circuit (not shown) which drives the air mixing damper of the air-conditioner unit. When the vehicle compartment temperature Taa detected by the vehicle compartment sensor 35 is read in, a judgment is made if the vehicle compartment temperature Taa is equal to the target vehicle compartment temperature $T_a'$. If judged equal the operation is finished at this stage. Then, after newly reading the skin temperature $T_s$, both the rate of change of skin temperature $\dot{T}_s$ and the target vehicle compartment temperature Taa are reviewed.

In case of Taa≠Taa', on the other hand, an opening of the air mixing damper 25 is calculated which will make the difference between Taa and Taa' disappear. Thereafter, the signal are sent to the driving circuit (not shown) to control the opening $\theta$ of the air mixing damper to that calculated as mentioned above. In this way, the routine is repeated.

In this embodiment, the vehicle compartment temperature Taa and the target vehicle compartment temperature $T_a'$ are compared to regulate the opening $\theta$ of the air mixing damper 25. If only Taa and Taa' are compared, it takes too much time to control the air mixing damper to make Taa and Taa' equal and it may take too long a time to provide the passengers with a comfortable environment. It is therefore desirable to create a new target vehicle temperature $T_a$ and to perform control accordingly, even if $T_a \neq T_a'$, by making the number of samplings N 10 (N=10), for instance.

As described above, in this embodiment, the rate of change of skin temperature $\dot{T}_s$ is estimated and a target vehicle compartment temperature $T_a'$ is calculated to allow control in response to changes in the skin temperature. Also, after passing of a specified time, both the rate of change of skin temperature $\dot{T}_s$ and the target vehicle compartment temperature $T_a'$ are reviewed even if the actual vehicle compartment temperature Taa and the target vehicle compartment temperature $T_a'$ are not the same. This embodiment, therefore, allows one to maintain comfortable conditions in both abnormal and normal states with periodical review of the comfort conditions of passengers.

With the skin temperature detecting means of an automatic air-conditioner as constructed above, the skin temperature of passengers is detected. The first calculating means calculates the rate of change of optimum skin temperature on the basis of the skin temperature detected. On the basis of this, the rate of changes of optimum skin temperature, and the skin temperature stated above, the second calculating means calculates a target vehicle compartment temperatures. On the basis of this target vehicle compartment temperature, the air-conditioning unit controls the vehicle compartment temperature. Then, the vehicle compartment temperature detected by the vehicle compartment temperature detecting means and the target vehicle compartment temperature are compared by the comparing means. If they are not equal, the air-conditioning unit control is corrected, and again the vehicle compartment temperature and the target vehicle compartment temperature are compared. If comparison is made for a specified time, the skin temperature is detected again and a new target vehicle compartment temperature is calculated even if the vehicle compartment temperature and the target vehicle temperature are not equal.

As described above, in this embodiment, the rate of change of skin temperature of passengers is estimated and a target value is automatically corrected to realize excellent control effects.

We claim:

1. A control apparatus for an air-conditioner comprising:

a flow controlling means for controlling the amount of air blown into a room;

a temperature control means for controlling the temperature of air blown into a room;

a skin temperature detecting means for detecting actual skin temperature of persons in a room;

a temperature sensation determining means for determining the actual temperature sensation of persons in the room based on the detected skin temperature and a rate of change of the detected skin temperature; and control means for controlling the flow controlling means so that the determined temperature sensation approaches a target temperature sensation, and for controlling the temperature control means.

2. A control apparatus for an air-conditioner comprising:

a skin temperature detecting means for detecting skin temperature of persons in a room;

a room temperature detecting means for detecting a temperature of the room;

a first calculating means for calculating an optimum rate of change of skin temperature;

a second calculating means for calculating a target room temperature on the basis of the detected skin temperature an optimum rate of change of skin temperature;

an air-conditioning means for controlling the room temperature in response to signals from the second calculating means;

a comparing means for comparing the detected room temperature and the target room temperature for a predetermined time interval and producing a comparison result;

a correcting means for correcting control performed by the air-conditioning means based on the comparison result;

and a target temperature changing means for causing the first and second calculating means to repeat their calculations.

3. A control apparatus for an air-conditioner comprising:

a blower for blowing temperature controlled air into a room;

detecting means for detecting a skin temperature of persons in the room; and control means for determining an amount of air to be blown into the room based on the detected skin temperature and a target skin temperature by which a target thermal sensation can be achieved within a predetermined time until the detected skin temperature equals the target skin temperature, and the control means activating the blower to blow the determined amount of air into the room.

4. A control apparatus according to claim 3, wherein the control means determines the amount of air to be blown into a room based on a temperature difference between the detected skin temperature and a target skin temperature by which a target thermal sensation can be achieved within a predetermined time until the detected skin temperature equals a target skin temperature.

5. A control apparatus for an air-conditioner comprising:

a blower for blowing temperature controlled air into a room;

detecting means for detecting a skin temperature of persons in the room; and a control means for determining an amount of air to be blown into the room to achieve a target thermal sensation based on the detected skin temperature, and for activating the blower to blow the determined amount of air into the room, wherein the control means determines the amount of air to be blown into the room based on a rate of change of the detected skin temperature.

6. A control apparatus for an air-conditioner comprising:

a blower for blowing temperature controlled air into a room;

detecting means for detecting a skin temperature of persons in the room; and a control means for determining an amount of air to be blown into the room to achieve a target thermal sensation based on the detected skin temperature, and for activating the blower to blow the determined amount of air into the room, wherein the control means determines the amount of air to be blown into the room based on a difference between the detected skin temperature and an estimated future skin temperature.

7. A control apparatus according to claim 3, wherein the control means determines the amount of air to be blown into a room based solely on the detected skin temperature until the detected skin temperature substantially equals a target skin temperature.

8. A control apparatus for an air-conditioner comprising:

a blower for blowing temperature controlled air into a room;

detecting means for detecting a skin temperature of persons in the room; and a control means for determining an amount of air to be blown into the room to achieve a target thermal sensation based on the detected skin temperature, and for activating the blower to blow the determined amount of air into the room, wherein the control means comprises:

a first processing means for calculating a target thermal sensation;

a second processing means for calculating a target skin temperature based on the target thermal sensation;

and a third processing means for determining an amount of air to be blown into the room based on a difference between the target skin temperature and the detected skin temperature.

9. A control apparatus according to claim 8, wherein said control means further comprises:

fourth processing means for calculating a target room temperature;

fifth processing means for calculating variations in target skin temperature based on the target room temperature;

sixth processing means for calculating a target temperature of air to be blown into the room based on the target room temperature; and temperature control means for controlling the temperature of air to be blown into the room based on the target temperature.

10. A control apparatus for an air-conditioner comprising:

a blower for blowing temperature controlled air into a room;

detecting means for detecting a skin temperature of persons in the room; and a control means for determining an amount of air to be blown into the room to achieve a target thermal sensation based on the detected skin temperature, and for activating the blower to blow the determined amount of air into the room, wherein the target thermal sensation is calculated based on at least one of an external temperature, a room temperature, a skin temperature at the beginning of the air-conditioner operation, and quantity of solar radiation representative of a thermal load to which a person has been exposed before the air conditioner has started.

11. A control apparatus for an air-conditioner equipped with a flow controlling means for controlling the air-conditioner so that a thermal sensation of persons in a room to be air conditioned approaches and maintains a target thermal sensation, said control apparatus comprising:

a first detecting means for detecting a thermal condition of persons in a room before the air conditioner has started;

a second detecting means for detecting at least one of an initial room temperature, a quantity of solar radiation, and an external temperature;

means for determining a target thermal sensation in response to one of the detected thermal condition, initial room temperature, quantity of solar radiation, and external temperature; and an adjusting means for adjusting the target thermal sensation so that when any one of initial room temperature, quantity of solar radiation, and external temperatures is increased and decreased the target thermal sensation is adjusted to a cooler and a warmer state, respectively.

12. A control apparatus according to claim 11, equipped with a skin temperature detecting means for detecting a skin temperature of persons in the room to be air conditioned, said control apparatus further comprising:

first processing means for calculating a target skin temperature to obtain a target thermal sensation; and second processing means for determining an amount of air to be blown into the room based on a difference between the target skin temperature and the detected skin temperature.

13. A control apparatus according to claim 12, wherein said control apparatus further comprises:

third processing means for calculating a target room temperature fourth processing means for calculating variations in target skin temperature, based on the target room temperature;

fifth processing means for calculating a target temperature of air to be blown into the room based on the target room temperature; and temperature control means for controlling the temperature of air to be blown based on the target temperature.

* * * * *

UNITED STATES PATENT AND TRADEMARK OFFICE
CERTIFICATE OF CORRECTION

PATENT NO. : 5,172,856

DATED : December 22, 1992

INVENTOR(S) : TANAKA, et al.

It is certified that error appears in the above-identified patent and that said Letters Patent is hereby corrected as shown below:

On the title page, item [54], lines 1-2, and Col. 1, lines 1-2, the title should read as follows:

-- CONTROL APPARATUS FOR AIR-CONDITIONER --

On the title page, item [73] should read as follows:

-- Nippondenso Co., Ltd., Kariya,
  Kabushiki Kaisha Toyota Chuo Kenkyusho, Aichi;
  both of Japan --

Signed and Sealed this

Nineteenth Day of April, 1994

*Attest:*

BRUCE LEHMAN

*Attesting Officer*    Commissioner of Patents and Trademarks